United States Patent [19]

Gram

[11] 4,143,758

[45] Mar. 13, 1979

[54] COOLING OR FREEZING APPARATUS

[75] Inventor: Hans Gram, Vojens, Denmark

[73] Assignee: Brødene Gram A/S, Vojens, Denmark

[21] Appl. No.: 821,345

[22] Filed: Aug. 3, 1977

[30] Foreign Application Priority Data

Aug. 13, 1976 [DK] Denmark .............................. 3674/76

[51] Int. Cl.² ............................................ B65G 47/82
[52] U.S. Cl. ................................... 198/624; 198/795; 62/381; 414/92
[58] Field of Search ............... 198/347, 422, 457, 472, 198/608, 610, 624, 795; 214/6 BA, 6 TS; 271/178, 179, 212; 62/63, 380, 381

[56] References Cited

U.S. PATENT DOCUMENTS

| 3,223,409 | 12/1965 | Eissfeld et al. | 271/179 |
| 3,568,860 | 3/1971 | Rawlins | 214/6 BA |
| 3,688,518 | 9/1972 | Goltsos | 62/63 |
| 3,837,504 | 9/1974 | Focke et al. | 214/6 BA |
| 3,993,189 | 11/1976 | Khoylian et al. | 198/472 |

FOREIGN PATENT DOCUMENTS 1246548 8/1967 Fed. Rep. of Germany.
6405101 11/1965 Netherlands ......................... 214/6 BA
1468924 3/1977 United Kingdom ..................... 198/624

Primary Examiner—Robert B. Reeves
Assistant Examiner—Richard K. Thomson
Attorney, Agent, or Firm—Watson, Cole, Grindle & Watson

[57] ABSTRACT

A cooling or freezing apparatus comprising a housing containing a transport for moving, in a vertical direction, carriers for the goods to be cooled or frozen in the apparatus the carriers arranged one above the other, wherein the transport being arranged at the bottom of the housing and comprising two transport devices, each of which consists of a plurality of mutually parallel support rails arranged as generatrices of an imaginary cylinder and being rotatable about the axis of the cylinder, the two transport devices being arranged along the sides of the housing opposite each other and being connected to a drive for rotating the oppositely arranged transport devices about the axis thereof in mutually opposite directions, each of the carriers for the goods being provided with a support along the sides of the carriers, the height of the support being less than the spacing between two adjacent support rails of a transport device.

3 Claims, 6 Drawing Figures

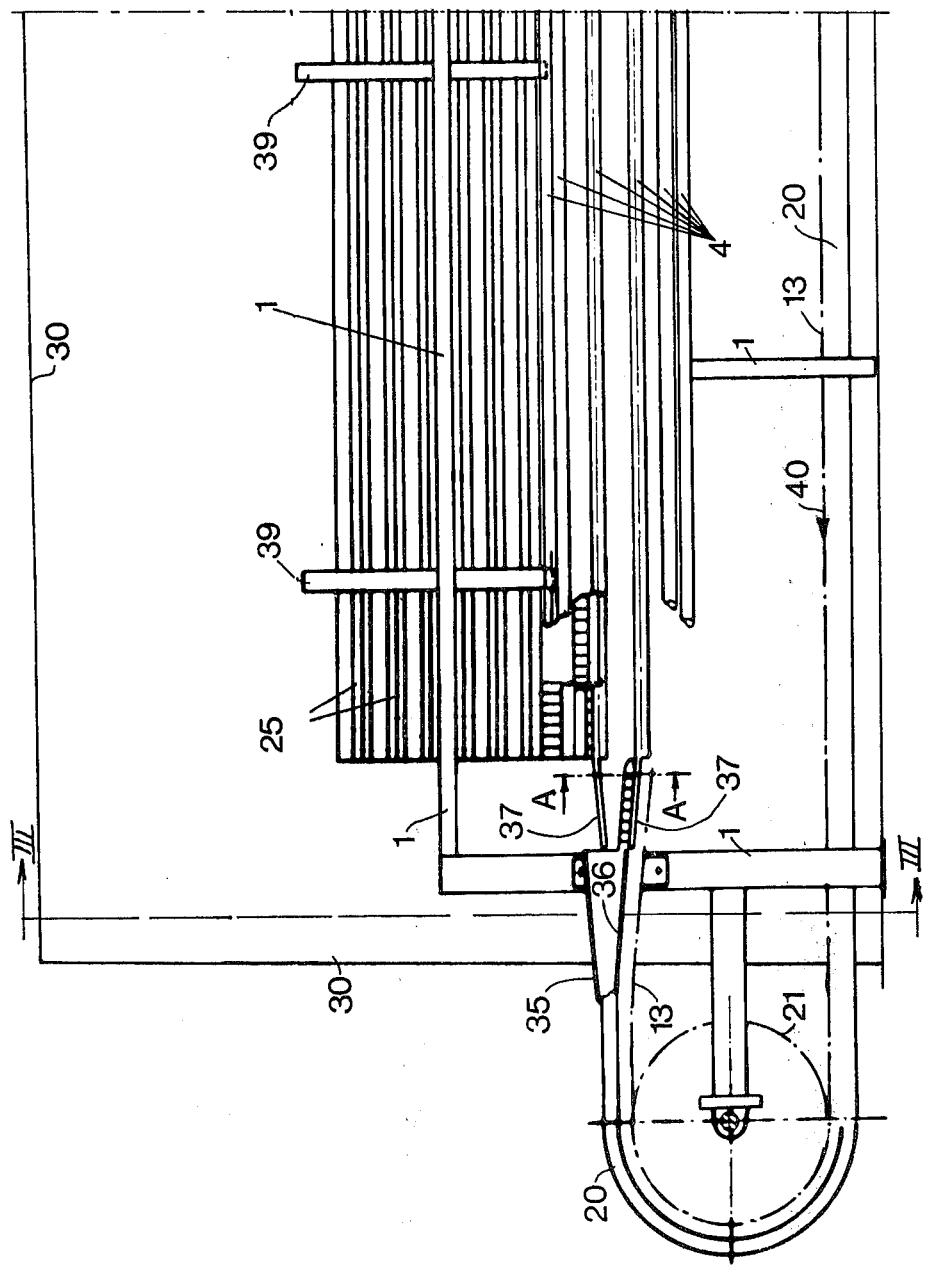

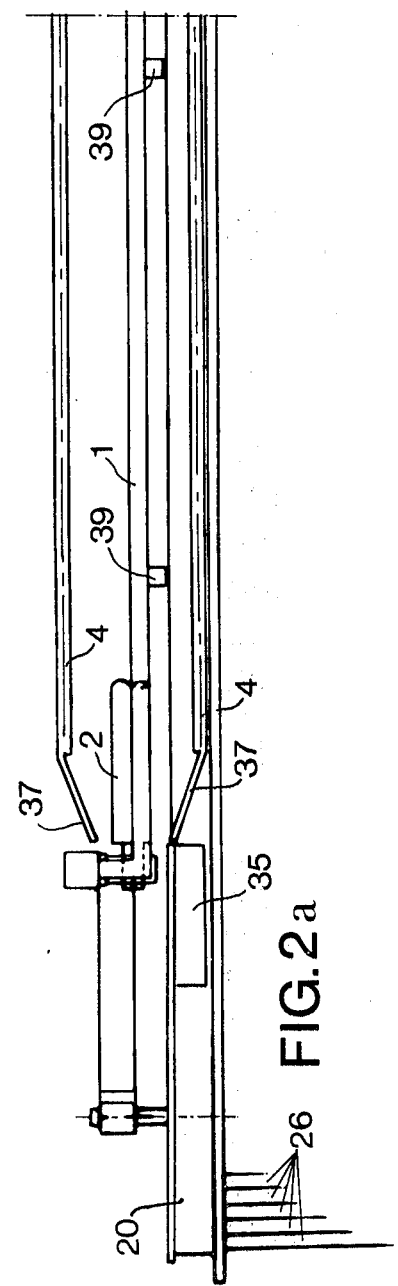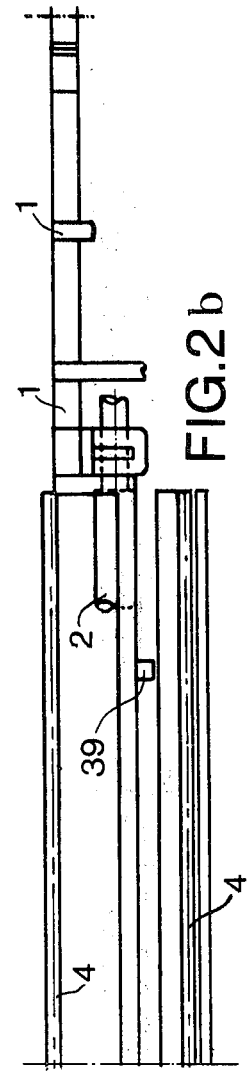

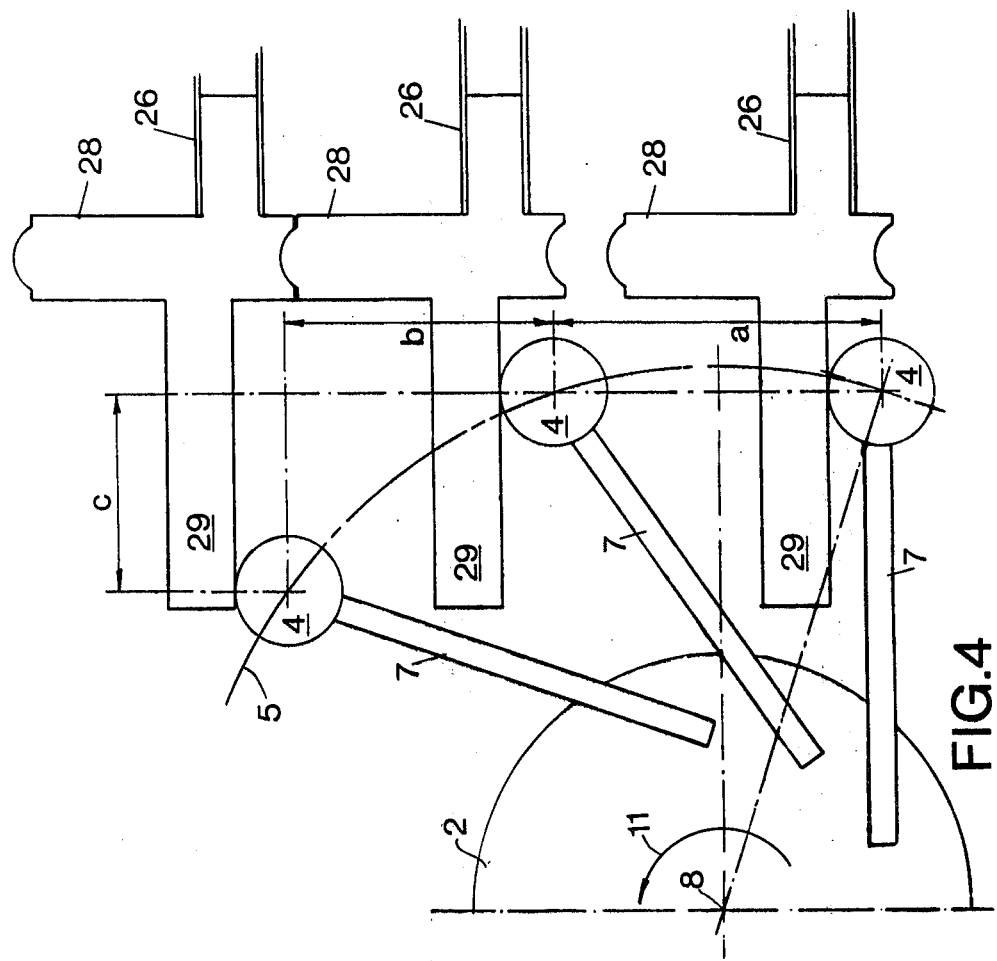

COOLING OR FREEZING APPARATUS

BACKGROUND OF THE INVENTION

This invention relates to a cooling or freezing apparatus comprising a housing containing means of transport for moving, in a vertical direction, carriers for the goods to be cooled or frozen in the apparatus, the carriers arranged one above the other.

Cooling or freezing apparatus of the kind stated above is previously known from U.S. Pat. No. 2,527,542. The specification of said U.S. patent discloses an apparatus, the transport means of which comprise two vertical endless conveyors extending along the full height of the housing and carrying angularly formed shelves which extend along the full width of the housing in such a way that carriers for the goods to be cooled or frozen may be arranged between the two endless conveyors on the oppositely arranged shelves. The carriers are pushed into the housing so as to be positioned upon two mutually oppositely arranged shelves at the bottom of the housing and are then moved upwardly to the upper end of the housing where the carriers are withdrawn from the housing. Through the housing, cold air is circulated.

SUMMARY OF THE INVENTION

According to the present invention, the means of transport are arranged at the bottom of the housing and comprise two transport devices each of which consists of a plurality of mutually parallel support rails arranged as generatrices of an imaginary cylinder and being rotatable about the axis of the cylinder, the two transport devices being arranged along the sides of the housing opposite each other and being connected to drive means for rotating the oppositely arranged transport devices about the axes thereof in mutually opposite directions, each of the carriers for the goods being provided with supporting means along the sides of the carriers, the height of the supporting means being less than the spacing between two adjacent support rails of a transport device.

By designing the cooling or freezing apparatus as defined above, the means of transport are highly simplified due to the fact that the carrier actually supported by the two transport devices will be able to support the carriers arranged there above, viz. via the supporting means provided along the sides of the carriers and, moreover, the height of the supporting means provides space below the lowermost carrier, after a certain rotation of the transport devices, for a further carrier which, accordingly, may be inserted below the lowermost carrier so as now to be the lowermost carrier, which after having been lifted by means of the transport devices may take over the support function in such a way that a pile of carriers is pushed upwardly through the housing.

According to an embodiment of the invention, the height of the supporting means along the sides of the carriers may correspond to the distance, in the vertical direction, between two adjacent support rails of a transport device, after rotation of the transport device an angle corresponding to the pitch of the support rails from a position in which the two adjacent support rails are positioned approximately vertically above each other. By means of this embodiment, it is achieved that the upwardly directed movement of the pile of carriers in the housing is not interrupted nor converted into a small downwardly directed movement when a further carrier takes over the supporting and lifting function.

According to a further embodiment of the invention, the support rails of each transport device may be connected to a shaft, extending centrally with respect to the corresponding support rails, by bracket means extending eccentrically with respect to the axis of the shaft. This embodiment offers ample space for the engagement of the support rails below the sides of the carriers.

Cooling or freezing apparatuses of the kind here in question may be provided with chain conveyors to insert the carriers into the housing and for removing the carriers from the housing. In order to achieve, in connection with an apparatus of the latter kind, an appropriate support of the leading end of a carrier during the initial insertion of the carrier and in order to achieve that also the trailing end is appropriately supported during the insertion, the support rails of the transport devices may according to a still further embodiment of the invention be provided with an inwardly bent end section at the entrance end of the housing.

BRIEF DESCRIPTION OF THE DRAWINGS

FIG. 1a and FIG. 1b show a side view of an embodiment of the cooling or freezing apparatus according to the invention, FIG. 2a and FIG. 2b show a plan view and a side section of the apparatus shown in FIGS. 1a and 1b, FIG. 3 shows an end view of the cooling or freezing apparatus shown in FIGS. 1a and 1b as seen from the left hand end of said figures according to line III—III in FIG. 1a, and FIG. 4 shows a detail of the apparatus on an increased scale according to section line A—A in FIG. 1a.

DESCRIPTION OF THE PREFERRED EMBODIMENT

Figure 1B:
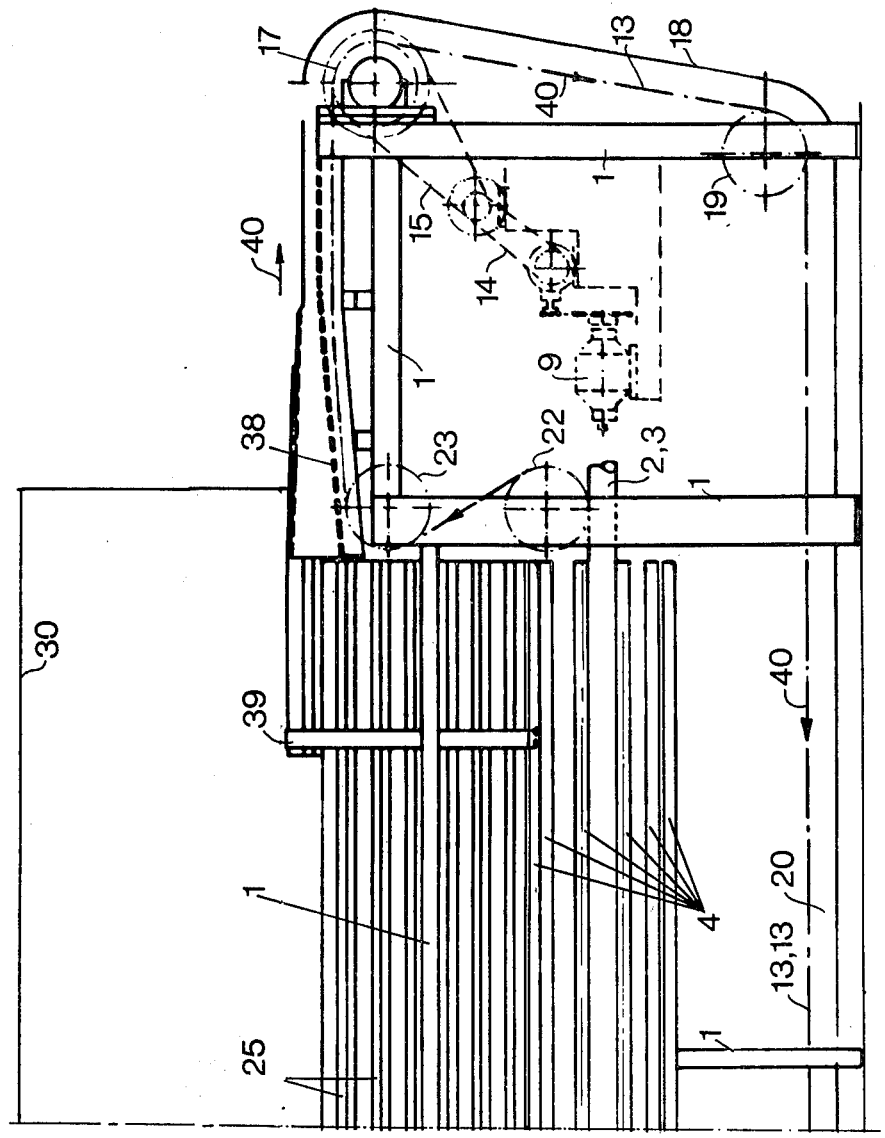

In the drawing, 1 is the basis or frame of the apparatus. Along each side of the frame, two longitudinally extending shafts 2 and 3 are arranged, one of which, 2, is positioned below the plane of the drawing in FIGS. 1a and 1b, whereas the other shaft 3 is positioned above said plane, as it appears from FIG. 3. To each shaft 2 and 3, a number of support rails 4, in the present instance ten such support rails, are secured. Support rails 4 extend generally along the full length of the apparatus and are arranged as generatrices around the corresponding shafts 2 and 3, respectively, viz. along an imaginary cylinder 5 and 6, respectively, in FIG. 3. Moreover, the support rails 4 are equally spaced along the imaginary cylinders in such a way that the pitch of the support rails 4 corresponds to an angle of 36°. As it clearly appears from FIG. 4, the support rails 4 are secured to the corresponding shaft, the shaft 2 on FIG. 4, by bracket means 7 extending eccentrically with respect to the axis 8 of the corresponding shaft.

The two shafts 2 and 3 together with the support rails 4 connected thereto, accordingly, form two cage-like transport devices, one arranged along each side of the cooling or freezing apparatus shown. The apparatus is provided with a motor 9, cf. FIG. 1b, which in a manner known per se and, accordingly, not further illustrated on the drawing, is connected with the two shafts 2 and 3 in such a way that the shafts are driven continuously and in mutually opposite directions as indicated by the arrows 11 and 12 of FIG. 3. The two transport devices consisting of a shaft and support rails connected thereto are driven by means of the motor 9 is synchronism in such a way that a support rail of one transport device is always positioned opposite a support rail of the other transport device.

Besides the two shafts 2 and 3, the motor 9 also drives two conveyor chains 13, 13 via a drive transmission 14, 15 as shown in FIG. 1b. The conveyor chains 13, 13 are endless and are arranged with one at each side of the apparatus. Each chain conveyor 13 extends around a sprocket 17 at the right hand uppermost corner of the apparatus, cf. FIG. 1b, from the sprocket 17 along a guard 18, around a sprocket 19, along a further guard 20, which extends along the bottom of the apparatus, around a sprocket 21 at the left hand end of the apparatus at which the chain conveyor in question also extends along a guard 20 and from the left hand end of the apparatus the chain conveyor 13 in question extends to a sprocket 22, around a sprocket 23 arranged above the sprocket 22 and returns to the sprocket 17. The two chain conveyors 13, 13 are provided with pushing dogs known per se and, accordingly, not further illustrated for moving carriers 25 through the apparatus. The carriers 25 are of a construction known per se and, accordingly, are not shown in all details. As examples of such carriers, reference is made to German patent specification No. 1,246,548. However, it should be noted that the carriers consist of slats extending perpendicular to the direction of movement of the carriers. The slats of a carrier are mutually hinged in such a way that the carrier may be moved by means of the chain conveyors 13, 13 around the sprockets 17, 19 and 20. The slats for a carrier are indicated in FIG. 2a at 26.

A spacer or supporting member 28, as shown in FIG. 4, is secured to each end of each slat of each carrier and a laterally extending flap 29 is secured to the outer surface of each such spacer or supporting member 28. The length of the flaps 29 corresponds generally to the distance, measured in the horizontal direction, between two adjacent support rails 4, 4 in the position which such two adjacent support rails occupy after having been rotated one pitch from the position wherein such two adjacent support rails are arranged vertically above each other, cf. the distance c in FIG. 4. Moreover, the spacers or supporting members 28 at each end of each slat 26 has a height b, cf. FIG. 4, which generally corresponds to the distance in the vertical direction between two adjacent support rails 4, 4 after rotation of such two adjacent support rails one pitch from the position wherein the two rails are positioned vertically above each other and in which vertical position the distance between two adjacent rails is a as shown in FIG. 4. Accordingly, the latter distance a is longer than the height b of the spacers or supporting members 28.

Figure 3:
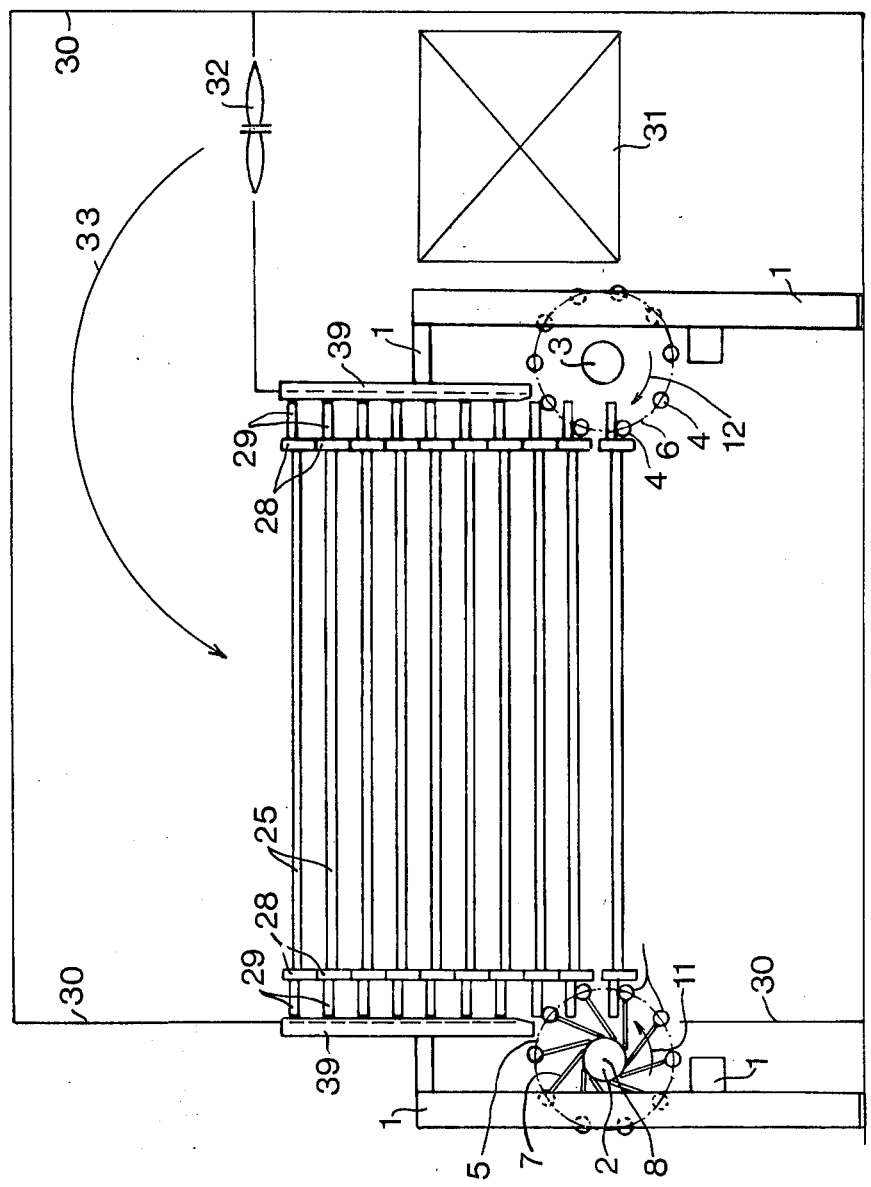

The major part of the apparatus is enclosed by a housing 30, wherein an evaporator 31 is arranged laterally with respect to the frame 1 as indicated in FIG. 3. A cooling medium is circulated through the evaporator 31 in a way known per se and, accordingly, not further illustrated and, moreover, air is circulated by means of a schematically indicated blower 32 through the evaporator 31, and the air cooled in this manner is indicated by means of the arrow 33 in FIG. 3, circulated down through the carriers positioned in the housing.

At the entrance end of the housing 30, cf. FIG. 1a, guide rails 35, 36, are arranged for guiding the carriers during the insertion of the carriers 25 into the transport devices. Moreover, at this end of the housing, the support rails are provided with inwardly bent end sections 37, cf. also FIG. 2a.

The apparatus illustrated and explained above operates in the following manner:

The conveyor chains 13, 13 are driven continuously by means of the motor 9 in direction of the arrows 40 and during their movement from the sprockets 23, via the sprockets 17, the sprockets 19 and the sprockets 21, the chain conveyors move, by means of the pushing dogs previously mentioned but not shown on the drawing, the leading ends of a number of carriers which follow closely after each other because the distance between the pushing dogs of the chain conveyors 13, 13 generally corresponds to the length of a carrier. During the passage of the carriers from the sprockets 17 via the sprockets 19 and until the carriers leave the upper portion of the sprockets 21, the laterally extending flaps 29 of the carriers are guided by means of the guards 18 and 20. The movement of the chain conveyors 13, 13 and the movement of rotation of the transport devices are synchronized in such a way that the inwardly bent end sections 37 of two oppositely arranged support rails 4, at the moment at which the leading end of a carrier arrives at the front end of the guiding rails 36 at the entrance end of the housing, cf. FIG. 1a, are positioned at the same level as the guiding rails 36 and, accordingly, the inwardly bent end sections 37 may support the leading end of the arriving carrier while the arriving carrier by means of the chain conveyors 13, 13 is drawn in upon the support rails 4 extending in extension of the end sections 37 in question. During this insertion or loading, the support rails 4 receiving the arriving carrier are moved continuously in the directions of the arrows 11 and 12, cf. FIG. 3, and due to the fact that the support rails 4 which receive the carrier, generally are positioned vertically below the support rails 4 positioned there above, the distance from the above carrier previously inserted is greater than the height of the spacers or supporting members 28, cf. the difference in height between the distances a and b, FIG. 4. During the termination of the insertion of an arriving carrier, the trailing end of such carrier will be supported by the inwardly bent end section of the receiving support rails 4, because these end sections now will point a little downwardly, because the corresponding support rails have been rotated approximately one pitch during the insertion, at the beginning of which the end sections in question pointed a little upwards. Accordingly, it is avoided that a carrier, which as mentioned previously is bendable or flexible, will whip with its trailing end.

When a carrier has been fully inserted and, accordingly, rests upon the corresponding pair of support rails 4, the leading end of the carrier in question is disengaged from the chain conveyors 13. This disengagement has not been illustrated on the drawing, but is carried out by moving the chain conveyors 13 around the sprockets 22 or by guiding the chain conveyors through appropriately arranged guiding means.

During the time which lapses during full insertion of a carrier onto the corresponding support rails 4, the support rails will be rotated an angle corresponding to one pitch in the direction of the arrows 11 and 12. During such rotation, the distance between the support rails in question and the preceding pair of support rails will decrease from the distance a to the distance b, FIG. 4, and due to the fact that the distance b generally corresponds to the height of the spacers or supporting members 28, it will be understood that the spacers or supporting members of a carrier do not abut the spacers or supporting members 28 of the above carrier until the insertion has been completed and, simultaneously, space has been provided below the carrier last inserted for inserting a further carrier in the way explained above.

As it will be seen from FIG. 4, the laterally extending flaps 29 of the carriers have such a length that the flaps, besides permitting engagement with the corresponding support rail during the movement of the rail from the lowermost to the intermediate position shown in FIG. 4, also permit supporting of the carrier in question while the support rail in question moves to the uppermost position shown in FIG. 4, wherein the support rail 4 in question is just about to leave a carrier which thereafter will rest upon the carrier below and, simultaneously, will support all the above carriers. Accordingly, each time a new carrier is inserted into the apparatus, a lifting of the whole pile of carriers will be caused, and provided the height of the spacers or supporting members 28, the length of the flaps 29, the mutual distance of the support rails 4 and the spacing of the support rails from their axis of rotation are adjusted appropriately with respect to each other, the pile of carriers may be lifted without any considerable shocks or lowerings of the pile when a new carrier is brought into engagement with the lower surface of the pile. Moreover, from FIG. 4, it will be seen that the eccentricity of the bracket means 7 connecting the support rails 4 and the shaft 2 results in a deep engagement between the support rails 4 and the lower surfaces of the flaps 29 without the necessity of using a clumsy and bulky transport device 2, 4, 7.

Moreover, the length and the movement of the chain conveyors 13, 13 are adjusted in such a way that when a carrier has been lifted to the uppermost position in the pile, the leading end of the carrier is engaged by the pushing dogs of the chain conveyors 13, 13 and the carrier is removed from the upper surface of the pile simultaneously with the insertion of a new carrier at the bottom end of the pile. In order to control a carrier being removed from the pile, guiding rails 38 are arranged as indicated in FIG. 1. In order to control the pile of carriers during the vertical movement through the housing, the frame of the apparatus is provided with side guides 39 at the sides of the pile and with corresponding side guides (not shown) at the ends of the pile.

I claim:
1. A cooling or freezing apparatus comprising
   a housing containing means of transport for moving, in a vertical direction, carriers for goods to be cooled or frozen in the apparatus, the carriers stacked one above the other,
   the means of transport being arranged at the bottom of the housing and comprising two transport devices, each of which includes a plurality of mutually parallel support rails connected to a shaft by bracket means extending eccentrically with respect to the axis of the shaft, the shaft extending centrally with respect to the corresponding support rails, said support rails being arranged as generatrices of an imaginary cylinder and being rotatable about the axis of the cylinder,
   the two transport devices being arranged along the sides of the housing opposite each other and connected to drive means for rotating the oppositely arranged transport devices about the axes thereof in mutually opposite directions,
   each of the carriers for the goods being provided with spacer means along the sides of the carriers, the height of the spacer means corresponding to the distance in the vertical direction between two adjacent support rails of a transport device after rotation of the transport device an angle corresponding to the pitch of the support rails from a position in which the two adjacent support rails are positioned vertically above each other,
   each of said carriers also being provided with laterally extending flap means for engagement with said support rails, the spacing of said flap means in the vertical direction and in the stacked position of the carriers corresponding to the height of said spacer means, said flap means moreover having a length corresponding to the distance in the horizontal direction between two adjacent support rails in the position which such two adjacent support rails occupy after having been rotated one pitch from the position in which such two adjacent support rails are positioned vertically above each other.

2. Cooling of freezing apparatus according to claim 1, wherein each transport device is connected to the shaft by bracket means extending eccentrically with respect to the axis of the shaft.

3. Cooling or freezing apparatus according to claim 1, wherein the support rails of the transport devices comprise end sections at the entrance end of the housing which are bent inwardly toward the shaft.

* * * * *